Jan. 11, 1949.   B. B. BACHMAN ET AL   2,458,549
SUSPENSION SYSTEM
Filed Dec. 11, 1945   3 Sheets-Sheet 1

LEADING GROUP OF BOGIES    TRAILING GROUP OF BOGIES

INVENTOR.
BENJAMIN B. BACHMAN
DONALD J. MACKLIN
BY
J. H. Church + H. E. Thibodeau
ATTORNEYS

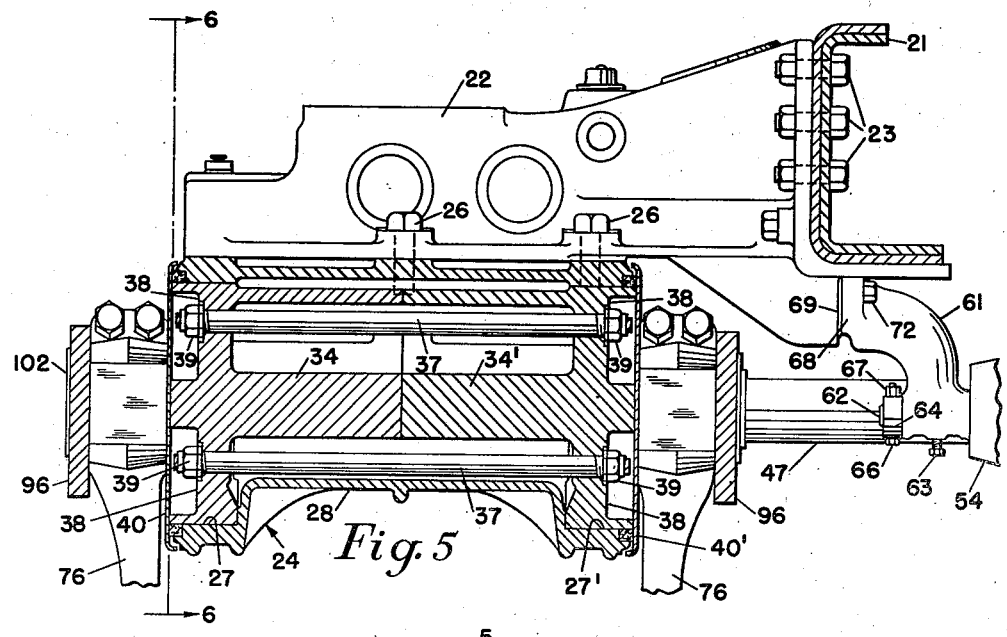
Fig. 5
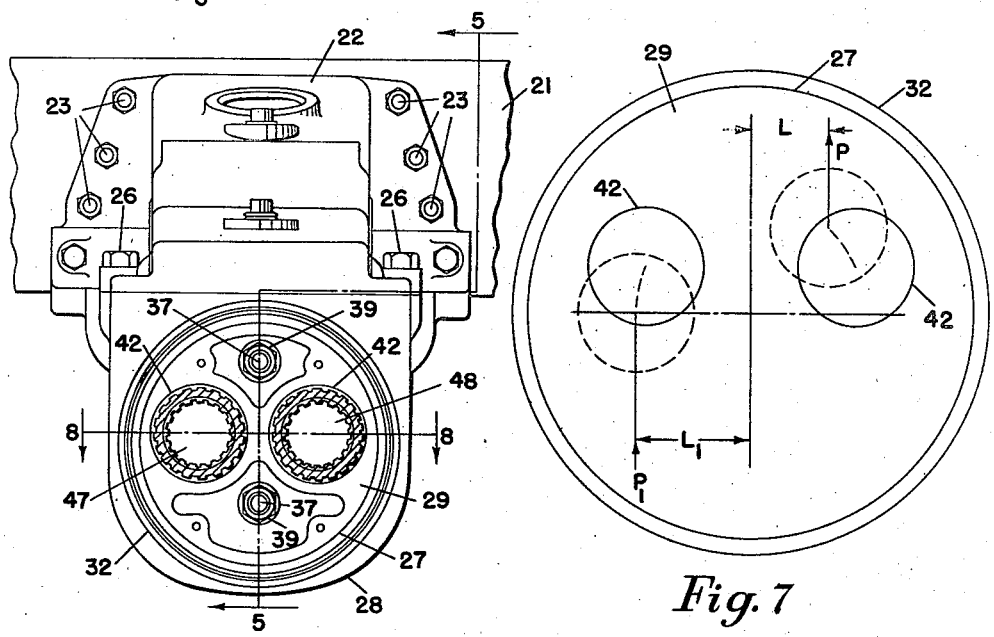
Fig. 6
Fig. 7

Patented Jan. 11, 1949

2,458,549

UNITED STATES PATENT OFFICE 2,458,549

SUSPENSION SYSTEM

Benjamin B. Bachman, Philadelphia, and Donald J. Macklin, St. Davids, Pa.

Application December 11, 1945, Serial No. 634,280

15 Claims. (Cl. 305—9)

This invention relates to a suspension system for band and link track vehicles of the type adapted to be supported on the track and also upon means disposed externally of the track. A half track is fairly representative of vehicles of this general class and, therefore, it has been selected for the purpose of illustrating the invention.

A half track is supported upon the ground by the track and also by the front wheels, which constitute a point of support disposed externally of the track. A suspension system for a full track vehicle is not satisfactory for use on a half track because a full track suspension system will not permit the front wheels of a half track to function properly as a supporting means when the vehicle is proceeding over uneven ground.

For instance, with a full track suspension on a half track, as the front wheels arrive at a receding slope, the track continues to advance the vehicle, but the frame thereof acts as a cantilever to suspend the front wheels above the ground until the front end of the vehicle by its own weight overbalances and plunges into the depression.

Likewise, with such a system when the front wheels arrive at an increasing slope they tend to push through it or to embed themselves into it because of the fact that these wheels must lift the front end of the vehicle, which they are intended to support and in addition, the weight normally carried by the front end of the track. This additional weight, intended to be carried by the track, acts through the frame of the vehicle as a leverage tending to force the front wheels into the ground. This produces an improper distribution of weight, the magnitude of which depends upon the type of terrain encountered.

It is, therefore, an important object of this invention to provide a track suspension system which will assure a proper distribution of weight between the track and the front wheels of a half track, for example, while permitting the front wheels to follow freely any uneven or irregular contours of the ground over which the vehicle may be progressing.

Another object is to provide a track suspension system having a common oscillatory center about which the whole vehicle may oscillate or pivot while traversing uneven ground.

Another object is to provide a suspension system having such a common oscillatory center about which the track as a unit may oscillate, and about which one or more portions of the track may partake of oscillatory motion independently and concurrently without interfering with the freedom of the entire vehicle to oscillate thereabout.

Another object is to provide a suspension system of the class described having such a common oscillatory center and having an inherent tendency to restore the system to its condition which is normal when it is proceeding over level ground.

Another object is to provide a suspension system of the class described with springs which may be readily adjusted to support the body of the vehicle at different heights.

Another object is to provide for readily replacing springs in a suspension system of the class described.

Another object is to provide for using torsion bars in a system of the class described and for limiting the amount of twist of the torsion bars.

A further object is to provide a suspension system of the class described having improved riding qualities and having an improved construction and relative arrangement of parts.

The features of the invention are illustrated in the accompanying drawings, wherein:

Fig. 5 is a sectional elevation along the line 5—5 of Fig. 6 with parts omitted and broken away for purposes of illustration;

Fig. 6 is a view taken along the line 6—6 of Fig. 5 with parts broken away for purposes of illustration;

Fig. 7 is a diagrammatic view illustrating an inherent restoring feature which may be embodied in the suspension system;

Figure 1:
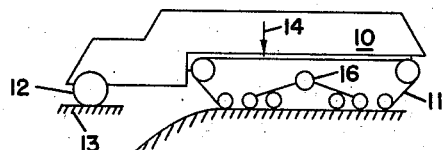
Fig. 1 is a diagrammatic view of a half track.

In Fig. 1 a vehicle of the class described is shown diagrammatically in the form of a half track, indicated generally at 10, and provided with a link track 11 adapted to support and propel the vehicle over the ground and a pair of front wheels 12 which constitute a point of support for the vehicle externally of track 11. For purposes of illustration the front wheels of this vehicle are shown as resting on any fixed support 13, while the ground recedes steeply from the forward end of the ground engaging portion of track 11. Assuming that the weight of the vehicle acts downwardly substantially along the line indicated by the arrow 14 through the center of gravity, it will be seen that if this half track were equipped with a track suspension, of the type used on full track vehicles, which does not permit the vehicle and the bogie wheel suspension system to oscillate bodily relative to each other, then if support 13 were removed from beneath the front wheels, the forward portion of the vehicle would remain suspended in substantially the position shown above the rapidly receding slope of the ground until the vehicle had advanced sufficiently to over-balance itself by its own weight, at which time the whole front end of the vehicle would swing downwardly and plunge down the decline. To avoid occurrences of this kind, the present invention provides a suspension system which may have a common center of oscillation indicated at 16 about which the whole vehicle may oscillate and about which the bogie wheel suspension system may oscillate relative to the vehicle, or parts of this bogie wheel suspension system may oscillate about this common center independently of oscillatory motion of the body of the vehicle. This makes it possible for the front wheels of the vehicle to readily follow changing contours of the earth over which the vehicle is advancing and in so doing, it will be understood that the front end of the vehicle is adapted to oscillate about the horizontal transverse axis at the common center of oscillation indicated at 16.

In the embodiment illustrated in Figs. 2 through 14, a longitudinal frame member of the vehicle is indicated at 21 and a transversely disposed, horizontally extending body suspension bracket or bolster in the form of a suitable casting 22 is mounted upon frame member 21, as by means of suitable attaching elements such as bolts 23. To provide a common center of oscillation for the body of the vehicle as well as for the bogie wheel suspension system, as previously pointed out herein, a generally cylindrical member in the form of a casting 24 may be supported or suspended from body suspension bracket 22, as by means of attaching bolts 26 securing casting 24 to body suspension bracket 22. Preferably casting 24 is provided at its outer ends (Fig. 5) with coaxial cylindrical bearing surfaces 27 and 27' which constitute radial bearings for supporting a trunnion member. As casting 24 is fixed to body bracket 22, the central portion of casting 24 may be offset upwardly as indicated at 28, Fig. 5, to provide additional clearance if this should be desired.

Figure 9:
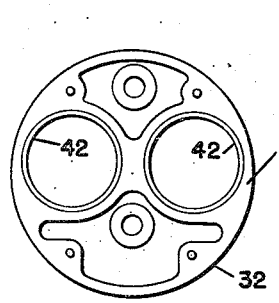
Figs. 9 and 11 are, respectively, end elevational views of right and left castings which together constitute a trunnion member shown in Figs. 5 and 8.
Figure 10:
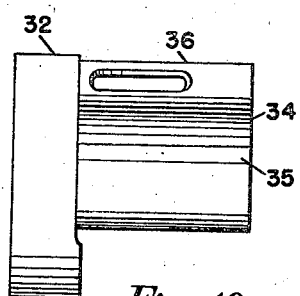
Fig. 10 is a side elevation of a casting shown in Fig. 9.
Figure 11:
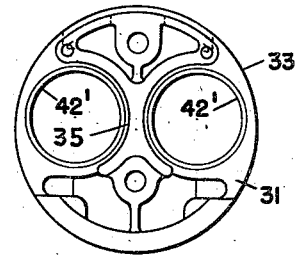
Figure 12:
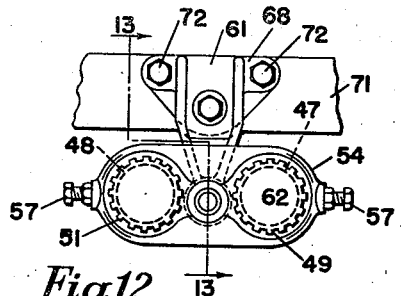
Fig. 12 is an end elevational view illustrating a body bracket pivotally supporting a link block secured to the inner ends of the torsion bars.
Figure 13:
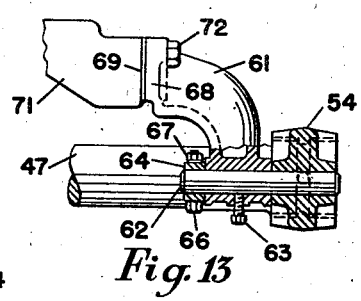
Fig. 13 is a section substantially along the line 13—13 of Fig. 12.
Figure 14:
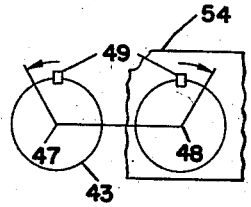
Fig. 14 is a diagrammatic view illustrating a manner in which the torsion bars may be initially adjusted and in which the height of the vehicle may be adjusted.

As shown in Figs. 9, 10 and 11, the trunnion member for casting 24 may comprise right and left sections in the form of castings 29 and 31, respectively, each having at its outer end cylindrical surfaces 32 and 33, respectively, which are adapted to fit within the bearing surfaces 27, 27' of casting 24. Each of right and left castings 29 and 31 are of the same general construction and, therefore, only casting 29 is shown in side elevation. As shown in Fig. 10, casting 29 is provided with a hollow body portion 34 having longitudinally straight and transversely concave side walls 35 joined by a convex upper wall 36. This body portion is adapted to fit freely within the reduced center portion 28 of casting 24. Preferably, the body portion 34 of casting 29 and the body portion 34' of casting 31 (Fig. 5) are of such a length as to have their adjacent inner ends in abutment substantially at the longitudinal midpoint of casting 24, while the bearing surfaces 32 and 33 of these castings are disposed in cooperative engagement with the radial bearings 27 and 27', respectively, of casting 24. It will thus be seen that these right and left castings 29 and 31 when assembled together in this manner constitute a trunnion which is rotatable relative to casting 24 in bearings 27 and 27'. For holding right and left castings 29 and 31 together in abutting relation as shown in Fig. 5, suitable tie rods 37 may be arranged to extend longitudinally between the ends of these castings and if desired, the outer end surfaces of the castings may be provided with suitable recesses 38 about the projecting ends of tie rods 37 and clamping nuts 39 may be secured on the threaded ends of these rods and disposed within recesses 38. The outer ends of castings 29 and 31 may be enclosed by securing thereto sheet metal caps or covers 40 and 40', respectively.

The outer end walls of right and left castings 29 and 31 are provided with a pair of laterally spaced radial bearings 42 so arranged that the bearings of one casting are in alignment and coaxial with similarly disposed bearings 42' in the other casting. These radial bearings receive sleeves 43 which are individually supported therein for rotary movement relative to the trunnion member. The outer ends of these sleeves project beyond the outer ends of casting 24. Substantially midway of the length of casting 24 each of sleeves 43 is provided with a suitable number of interior splines 44 cooperatively engaging complementary splines 46 on torsion bars 47 and 48, respectively. These torsion bars extend from the interior of sleeves 43 toward the vehicle and on their projecting outer ends have exterior splines 49 and 51 cooperatively engaging interior splines 52 and 53 formed in spaced bores of a link block 54. Preferably, the splined end portions 49 and 51 have circumferential grooves 56 disposed thereabout to receive the inner ends of adjusting screws 57 mounted on the link block for securing the latter in the desired position of longitudinal adjustment with respect to the torsion bars.

A suitable bearing bracket 61 (Figs. 5, 8, 12 and 13) carried by the vehicle frame, receives and supports a pivot pin 62. This pivot pin may be held from longitudinal movement in the bracket by means of a set screw 63 (Fig. 13) and a collar 64 affixed to the inner end of the pivot pin to hold the latter from axial movement to the right as viewed in Fig. 13. This collar may be in the form of a ring secured about the pivot pin by means of clamping bolt 66 and nut 67 thereon. The pivot pin projects outwardly from the bracket and has its outer end journalled in a link block 54 substantially midway between the torsion bars for supporting the link block for pivotal movement about this pivot pin. Preferably, the pivotal axis provided by this pivot pin is coaxial with radial bearings 27 and 27' so that the link block and the trunnion member comprising castings 29 and 31 are supported for rotary movement about a common axis. Conveniently bearing bracket 61 may be provided with an attaching flange 68 and secured to a vertical wall 69 of a depending portion 71 of body suspension bracket 22, as by means of attaching elements such as bolts 72.

In order to provide for suspending the vehicle on the bogie wheels through these torsion bars, the ends of sleeves 43 projecting beyond both ends casting 24 may have splined thereon as indicated at 75 (Fig. 8), the inner adjacent ends of oppositely disposed pairs of arms 76. As shown more clearly in Fig. 3, suitable struts 77 may be connected between the arms 76 of each pair.

Groups of any suitable number of bogie wheels may be disposed along track 11 and operatively associated with the outer ends of arms 76. Each of these groups may comprise two dual bogie wheels 78 of sufficient diameter to assure desired performance, and a third dual bogie wheel 79 disposed inwardly of bogie wheels 78 may be somewhat smaller in diameter than the latter to provide additional clearance, if this should be desired. These dual bogie wheels may be disposed on track 11 astride a center guide 80 (Figs. 2 and 3) in a manner well known in the art. Each of bogie wheels 78 of each group may be mounted on an axle 81 and suitable side frames preferably in the form of walking beams 82 may be mounted on these axles. These walking beams may be connected, preferably at their longitudinal midpoint, by a suitable strut 83. Likewise, each of dual bogie wheels 79 may be mounted upon an axle 84 upon which one end of side frames or walking beams 86 may be rotatably supported while the opposite ends thereof are mounted to pivot at 87 on walking beams 82, preferably midway between axles 81 on which these beams are rotatably supported. A suitable strut 88 may be connected between each pair of walking beams 86. On each of walking beams 86, and preferably at substantially one-third of the distance from pivotal connection 87 to axle 84, a pin 89 may be rotatably mounted. The outer end of each of these pins may be affixed to the lower end of an arm 76 associated therewith. For this purpose each of arms 76 may be provided at its lower end with a bearing 91 in which a pin 89 may be disposed. The outer end of each arm 76 may be bifurcated by a slot extending radially through the bearing surface and the split bearing may be drawn together about the pin by tightening a clamping bolt 92 in the furcations 93, 94 at the end of arms 76.

In order to prevent excessive upward movement of arms 76 and to limit the twist which may be applied to the torsion bars, crab members 96 (Figs. 2, 3 and 8) may be supported on the outer ends of sleeves 43. Preferably the outer ends of these sleeves extend into, and are free to turn in complementary holes in the crab members, so that the latter are supported on the sleeves and this does not interfere to any objectionable degree with rotary movement of the sleeves. The divergent arms 97, 98 of the crab members may be connected by struts 99, and suitable buffers 101 may be pivotally suspended from these struts above each of arms 76. Preferably, suitable caps or cover plates 102 are attached to crab members 96 to overlie and enclose the outer ends of sleeves 43.

In using a suspension system as thus far described herein, it will be seen that bearing surfaces 27, 27' of casting 24 support the body of the vehicle on bearing surfaces 32 and 33 of the trunnion member, comprising castings 29 and 31, for pivotal or oscillatory motion about the horizontal axis of these bearing surfaces. This construction makes it possible for the body of the vehicle freely to oscillate or pivot in this manner independently of, relative to and concurrently with any oscillatory or other motion transmitted to or from the track. Likewise, this same construction provides for similar oscillatory motion of the bogie suspension system relative to the body of the vehicle. This assures that the front wheels 12 will be readily displaced vertically as may be required to permit them to follow any uneven or irregular contours of the ground over which the vehicle may be progressing. These features of construction also provide for a good distribution of weight by assuring that the front wheels will carry an adequate proportion of the total weight under the various conditions which may be encountered.

Figure 2:
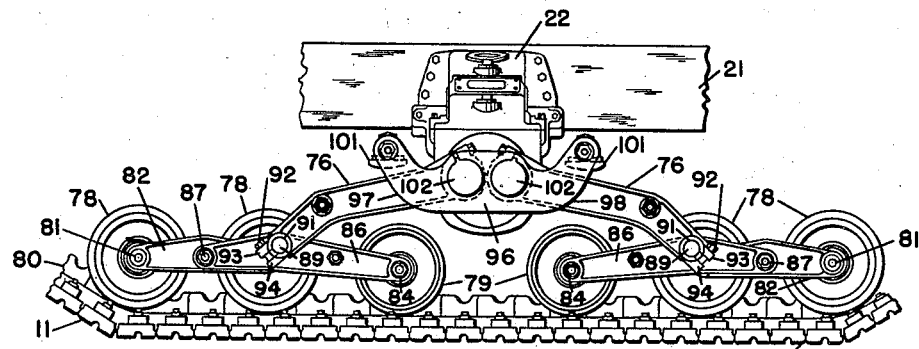
Fig. 2 is a side elevation of a bogie suspension system for a half track.
Figure 3:
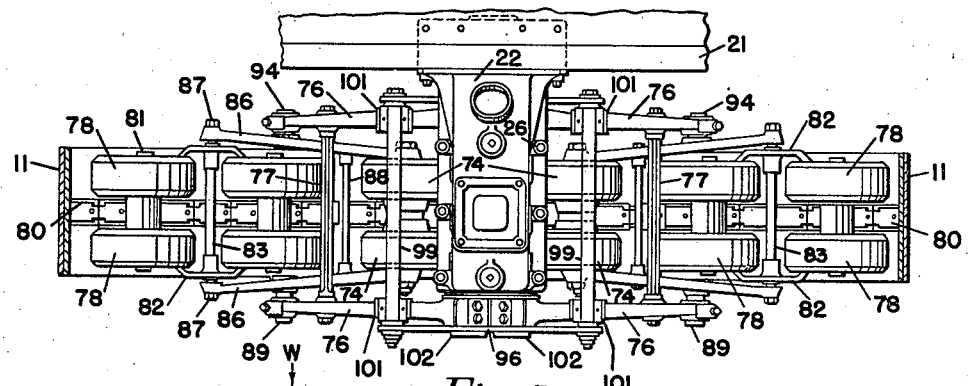
Fig. 3 is a plan view of the suspension system shown in Fig. 2.

In considering the bogie wheel suspension system as shown in Fig. 2, it will be seen that in advancing over an object, such as a small log, the axis of the leading bogie wheel may rise 6 inches, for example, thereby raising pivotal connection 87 at the midpoint of walking beam a distance of 3 inches. As pivot pin 89 is spaced two-thirds of the length of walking beam 86 from axle 84 of the trailing bogie wheel, pin 89 and arm 76 would rise 2 inches. Likewise, if trailing bogie wheel 79 should rise 3 inches, this would raise pin 89 and arm 76 one inch. It will be evident therefore, that whatever obstacles are traversed by the track, the resulting displacement of the bogie wheels will be transmitted in varying degrees through the walking beams to the lower ends of arms 76. As the upper ends of these arms are splined to sleeves 43 which are splined to the torsion bars, it will be clear that any upward displacement of pins 89 will produce a pivotal movement of these arms about the axes of the sleeves and this movement will be resisted and restrained by both torsion bars, as link block 54 forms a rigid connection therebetween.

Figure 4:
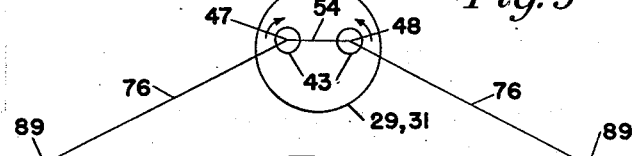
Fig. 4 is a diagrammatic view illustrating certain operational features of the suspension system.
Figure 8:
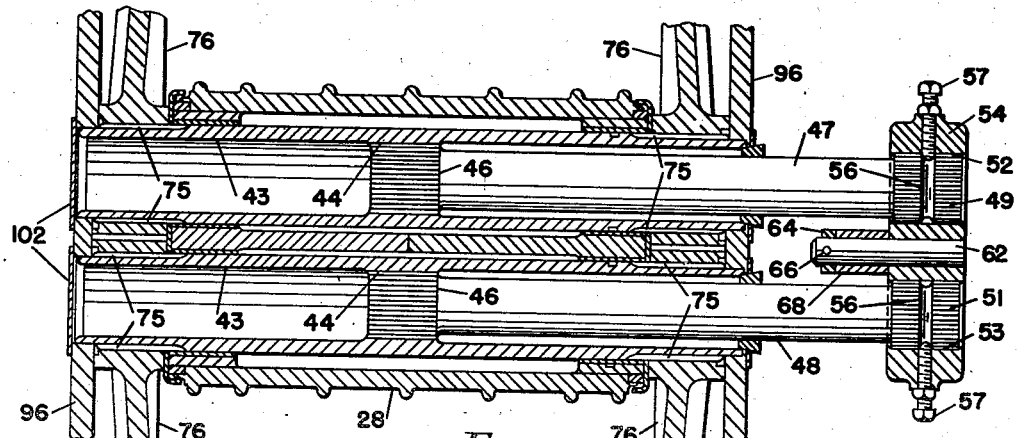
Fig. 8 is a section along the line 8—8 of Fig. 6.

In Fig. 4, the weight W carried by this suspension system may be considered as acting vertically downwardly over the center of trunnion members 29, 31 as indicated by the arrow. It will be understood from this view that if bogie wheels of the leading group are displaced upwardly so that pin 89, indicated on the left in Fig. 4, is moved upwardly, the arm 76 connected thereto will pivot about the axis of the sleeve 43 to which it is connected, and the action of torsion bar 48 in restraining this movement will also produce a reaction tending to swing in a clockwise direction the arm 76 associated with torsion bar 48, thereby producing a downward reaction at pin 89 of the trailing group of bogie wheels. As trunnion 29, 31 is free to rotate in bearings 27, 27' (Fig. 5), these reactions impart clockwise rotary motion to the trunnion and cause it to carry sleeves 43 and the torsion bars through a variable small part of a revolution, depending upon the nature of the reactions which produce this motion. From the foregoing, those skilled in this art will readily understand that this system is responsive in similar or analogous ways to the many and varied reactions and combinations thereof which may be encountered, and therefore, further discussion thereof is deemed unnecessary.

It is also preferred to embody in a system of this kind an inherent restoring tendency so that the system will return automatically to its initial or normal condition as the forces which disturb that condition disappear. This may be accomplished, as shown in Fig. 7, by mounting sleeves 43 in the trunnion member so that their longitudinal axes lie in a substantially horizontal plane just above the rotary axis of the trunnion member. This is shown greatly exaggerated in Fig. 7, merely for purposes of illustration.

It may be assumed that the initial or normal condition of the system is shown in full lines and that the system has been subjected to a force P which caused the trunnion member to travel about its axis in a counterclockwise direction until it came to rest momentarily with sleeves 43 in the positions indicated in dotted lines. From the manner in which the torsion bars are connected into the system it will be clear that the force $P_1$ restraining further movement or displacement must be equal to the force P tending to produce further movement. However, force P is acting through a lever arm L which is considerably shorter than lever arm $L_1$ through which restoring force $P_1$ is acting. Hence, clockwise moment $P_1L_1$ is greater than counter clockwise moment PL, and the system will restore itself to its initial condition. Those skilled in this art will understand that in actual practice the axes of the sleeves may be in a plane above and very close to the rotary axis of the trunnion member. The actual dimensions will depend upon the characteristics of a particular vehicle and the amount of restoring tendency desired.

In order to provide for a very fine or substantially vernier adjustment of the torsion bars, the ends thereof which are connected to link block 54 may and preferably do have one more spline than the ends which connect to sleeves 43. Thus, there may be forty-eight splines 49 on torsion bar 47 and a like number of splines 51 on torsion bar 48 for engagement with complementary interior splines 52 and 53 in link block 54. The other ends of both torsion bars may have only forty-seven splines 46 for engagement with the interior splines 44 of sleeve 43. It then becomes possible to set one torsion bar, as 47, for example, ahead one spline (Fig. 14) in the sleeve 43 to which it is connected, while the other torsion bar, as 48, may be set back or in the opposite direction one spline in the link block. It will be evident that this provides a very fine adjustment which is useful for adjusting the height at which the body of the vehicle is suspended above the ground. This adjustment is also useful for other purposes, as for taking up for permanent set of springs, and the like.

What we claim is:

1. A vehicle of the class described, comprising a frame, a track, a plurality of groups of bogie wheels cooperating with said track, a bogie wheel suspension system comprising oppositely extending arms, means for supporting the adjacent inner ends of said arms for oscillatory movement about axes extending transversely of the track, a group of bogie wheels associated with the outer end of each of said arms, means responsive to movement of the axis of a bogie wheel of a group for causing the outer end of the arm associated with that group to pivot about the axis at the inner end of the latter arm, and bearing means substantially encompassing the axes of said arms for supporting said frame for oscillatory movement.

2. A vehicle of the class described, comprising a frame, a track, a plurality of groups of bogie wheels cooperating with said track, a bogie wheel suspension system comprising oppositely extending arms, means for supporting the adjacent inner ends of said arms for oscillatory movement about axes extending transversely of the track, a group of bogie wheels associated with the outer end of each of said arms, means responsive to movement of the axis of a bogie wheel of a group for causing the outer end of the arm associated with that group to pivot about the axis at the inner end of the latter arm and bearing means substantially encompassing the axes of said arms for supporting said frame for oscillatory movement, and means for supporting the axes of said arms for oscillatory movement about the axis of said bearing means.

3. A vehicle of the class described, comprising a frame, a track, a plurality of groups of bogie wheels cooperating with said track, a bogie wheel suspension system comprising oppositely extending arms, means for supporting the adjacent inner ends of said arms for oscillatory movement about axes extending transversely of the track, a group of bogie wheels associated with the outer end of each of said arms, means responsive to movement of the axis of a bogie wheel of a group for causing the outer end of the arm associated with that group to pivot about the axis at the inner end of the latter arm, means for supporting the axes of said arms for oscillatory movement about an axis substantially equidistant therefrom, and means for supporting said frame for oscillatory movement about the latter axis.

4. A vehicle of the class described, comprising a frame, a track, a plurality of groups of bogie wheels cooperating with said track, a bogie wheel suspension system comprising oppositely extending arms, means for supporting the adjacent inner ends of said arms for oscillatory movement about axes extending transversely of the track, a group of bogie wheels associated with the outer end of each of said arms, means responsive to movement of the axis of a bogie wheel of a group for causing the outer end of the arm associated with that group to pivot about the axis at the inner end of the latter arm, means for restraining pivotal movement of said arms about the respective axes thereof, and means for supporting said frame for oscillatory movement about an axis approximately equidistant from the axes of said arms.

5. A vehicle of the class described, comprising a frame, a track, a plurality of groups of bogie wheels cooperating with said track, a bogie wheel suspension system comprising oppositely extending arms, means for supporting the adjacent inner ends of said arms for oscillatory movement about axes extending transversely of the track, a group of bogie wheels associated with the outer end of each of said arms, means responsive to movement of the axis of a bogie wheel of a group for causing the outer end of the arm associated with that group to pivot about the axis at the inner end of the latter arm, mutually reactive means for restraining pivotal movement of said arms about the respective axes thereof, and bearing means substantially encompassing the axes of said arms for supporting said frame for oscillatory movement.

6. A vehicle of the class described, comprising a frame, a track, a plurality of groups of bogie wheels cooperating with said track, a bogie wheel suspension system comprising oppositely extending arms, means for supporting the adjacent inner ends of said arms for oscillatory movement about axes extending transversely of the track, a group of bogie wheels associated with the outer end of each of said arms, means responsive to movement of the axis of a bogie wheel of a group for causing the outer end of the arm associated with that group to pivot about the axis at the inner end of the latter arm, means for supporting the axes of said arms for oscillatory movement about an axis below and substantially equidistant therefrom, and means for supporting said frame for oscillatory movement about the latter axis.

7. A vehicle of the class described, comprising a frame, a track, a plurality of groups of bogie wheels cooperating with said track, oppositely disposed arms extending longitudinally of said track, means for supporting the adjacent inner ends of said arms for oscillatory movement about axes extending transversely of the track, torsion bars for restraining movement of said arms about said axes, a link affixed to said torsion bars, means carried by the frame for supporting said link for pivotal movement about an axis intermediate the oscillatory axes of said arms, means responsive to movement of the axis of a bogie wheel of a group for imparting pivotal movement to the arm associated with that group, and means for supporting said frame for oscillatory movement about the pivotal axis of said link.

8. A vehicle of the class described, comprising a frame, a track, a plurality of groups of bogie wheels cooperating with the track, torsion bars, sleeves affixed intermediate their ends to said torsion bars at one of the ends thereof, oppositely disposed arms extending longitudinally of the track and affixed substantially at their adjacent inner ends to the ends of said sleeves, a link affixed to said torsion bars at the other of the ends thereof, means rigid with the frame for supporting said link for pivotal movement about an axis substantially equidistant from said sleeves, means responsive to movement of the axis of a bogie wheel of a group for imparting pivotal movement to the arm associated with that group, and means for supporting said frame for oscillatory movement about the pivotal axis of said link.

9. A vehicle of the class described, comprising a frame, a track, a plurality of groups of bogie wheels cooperating with the track, torsion bars, sleeves affixed intermediate their ends to said torsion bars at one of the ends thereof, oppositely disposed arms extending longitudinally of the track and affixed substantially at their adjacent inner ends to the ends of said sleeves, a link affixed to said torsion bars at the other of the ends thereof, means rigid with the frame for supporting said link for pivotal movement about an axis substantially equidistant from said sleeves, means responsive to movement of the axis of a bogie wheel of a group for imparting pivotal movement to the arm associated with that group, trunnions carried by the sleeves and having bearing surfaces substantially coaxial with the pivotal axis of said link, and means carried by the frame for supporting the latter on said bearing surfaces.

10. A vehicle of the class described, comprising a frame, a track, a plurality of groups of bogie wheels cooperating with the track, torsion bars, sleeves affixed intermediate their ends to said torsion bars at one of the ends thereof, means for securing the other of the ends of said torsion bars substantially from relative rotary motion about their respective axes, oppositely disposed arms extending longitudinally of the track and affixed substantially at their adjacent inner ends to the ends of said sleeves, means carried by said sleeves and cooperating with said arms for limiting the amount of twist of said torsion bars, means responsive to movement of the axis of a bogie wheel of a group for imparting pivotal movement to an arm associated with that group, and bearing means substantially encompassing said sleeves for supporting said frame for oscillatory movement.

11. A vehicle of the class described, comprising a frame, a track, a plurality of groups of bogie wheels cooperating with the track, torsion bars, sleeves affixed intermediate their ends to said torsion bars at one of the ends thereof, means for securing the other of the ends of said torsion bars substantially from relative rotary motion about their respective axes, oppositely disposed arms extending longitudinally of the track and affixed substantially at their adjacent inner ends to the ends of said sleeves, means responsive to movement of the axis of a bogie wheel of a group for imparting pivotal movement to the arm associated with that group, and means for supporting said frame for oscillatory motion about an axis between and substantially equidistant from said sleeves.

12. A vehicle of the class described, comprising a frame, a track, a plurality of groups of bogie wheels cooperating with the track, torsion bars, sleeves affixed intermediate their ends to said torsion bars at one of the ends thereof, means for securing the other of the ends of said torsion bars substantially from relative rotary motion about their respective axes, oppositely disposed arms extending longitudinally of the track and affixed substantially at their adjacent inner ends to the ends of said sleeves, means responsive to movement of the axis of a bogie wheel of a group for imparting pivotal movement to the arm associated with that group, and means for supporting said frame for oscillatory movement about an axis substantially equidistant from the axes of said sleeves and just below the plane of the latter axes and between said sleeves.

13. A vehicle of the class described, comprising a frame for the vehicle, torsion bars, a circumferential row of a given number of splines about one end of each torsion bar, a circumferential row of said given number plus one like splines about the other end of each torsion bar, a sleeve disposed about each torsion bar, internal splines in said sleeves for interengagement with the splines at said one end of the torsion bar associated therewith, a link block having bores to receive said other ends of said torsion bars, internal splines in said bores for interengagement with the splines at said other end of each torsion bar, means carried by said sleeves for supporting said frame for oscillatory movement relative thereto, a track for the vehicle, bogie wheels engaging said track and arranged in groups associated respectively with each of said sleeves, and suspension means for transmitting torque between each sleeve and the group of bogie wheels associated therewith.

14. A vehicle of the class described, comprising a frame for the vehicle, torsion bars, a circumferential row of a given number of splines about one end of each torsion bar, a circumferential row of said given number plus one like splines about the other end of each torsion bar, a sleeve disposed about each torsion bar, internal splines in said sleeves for interengagement with the splines at said one end of the torsion bar associated therewith, a link block having bores to receive said other ends of said torsion bar, internal splines in said bores for interengagement with the splines at said other end of each torsion bar, means rigid with said frame for supporting said link block for pivotal movement about an axis disposed between said bores below the plane of the axes thereof and substantially equidistant from the latter axes, means carried by said sleeves for supporting said frame for pivotal movement substantially coaxial with the piovtal axis of said link block, a track for the vehicle, bogie wheels engaging said track and arranged in groups associated respectively with each of said sleeves, and suspension means for transmitting torque between each sleeve and the group of bogie wheels associated therewith.

15. A vehicle of the class described comprising a frame, a track, groups of bogie wheels disposed along the track, axles for said wheels, walking beams connected to the axles of the wheels of each group for distributing the weight thereon, oppositely disposed arms extending longitudinally of the track, a pivotal connection between the outer end of each of said arms and the walking beams for a group of wheels, means for supporting the adjacent inner ends of said arms for oscillatory movement about axes disposed transversely of the track, torsion bars for restraining movement of said arms about said axes, means for supporting said supporting means for the inner ends of said arms for rotary movement of said axes about a common axis, and means for supporting said frame for oscillatory movement about said common axis.

BENJAMIN B. BACHMAN.
DONALD J. MACKLIN.

REFERENCES CITED

The following references are of record in the file of this patent:

UNITED STATES PATENTS

| Number | Name | Date |
|---|---|---|
| 1,952,078 | Knox | Mar. 27, 1934 |
| 2,342,110 | Barber | Feb. 22, 1944 |